June 13, 1944.  G. D. MALLORY  2,351,350
PROCESS OF LAMINATING FILM
Original Filed Jan. 9, 1942
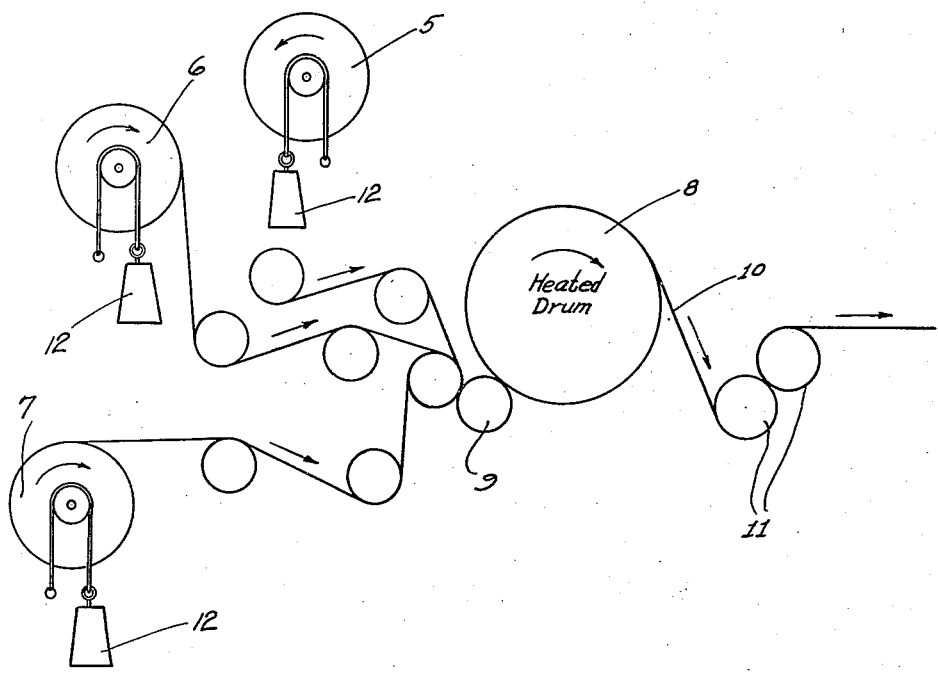
Inventor
Gerald D. Mallory
By
Attorney Patented June 13, 1944

2,351,350

UNITED STATES PATENT OFFICE 2,351,350

PROCESS OF LAMINATING FILM

Gerald D. Mallory, Akron, Ohio, assignor to Wingfoot Corporation, Akron, Ohio, a corporation of Delaware Substitute for abandoned application Serial No. 426,224, January 9, 1942. This application April 23, 1943, Serial No. 484,225

2 Claims. (Cl. 18—57)

This invention relates to the lamination of several plies of rubber hydrochloride film by heat and pressure. Rubber hydrochloride film is produced commercially by casting a cement or dispersion of rubber hydrochloride in a solvent, such as benzene or chloroform, and then evaporating the solvent. After part of the solvent has been evaporated, the film is removed from the casting surface and is supported on a tenter so that the balance of the solvent can be evaporated from both sides of the film.

Some commercial rubber hydrochloride film contains a considerable amount of an elasticizing agent, such as, for example, 10 per cent or more of butyl stearate or 10 per cent or more of dibutyl phthalate, which is added to the film before casting to increase its impact strength and tear resistance. Film which contains such a large amount of such an elasticizing agent is somewhat stretchable at room temperature. In laminating, two or more plies of such film can be stretched sufficiently at room temperature or thereabout to overcome any tendency toward bagging or wrinkling, and the plies are, therefore, readily laminated in a perfectly flat condition. It is not necessary to heat such film, as herein described, prior to lamination; and the invention relates more particularly to heating film which contains no elasticizer, or only a small amount of elasticizer, and then laminating two or more plies by heat and pressure.

Unelasticized film or film elasticized with not more than 5 per cent of butyl stearate or an equivalent amount of another elasticizer is not readily stretchable at room temperature. Different elasticizers affect the film to different extents so that on using the same amount of two different elasticizers, one may obtain one film which is sufficiently stretchable at room temperature to overcome bagging and wrinkling and another film which will not stretch sufficiently to overcome these tendencies. Therefore, as it is impossible, for the purpose of this invention, to described the film by referring to the amount of elasticizer which it contains, such film will be described by referring to the effect of the elasticizer upon it. The expression "high internal friction" will be used herein to refer to rubber hydrochloride which contains no elasticizer and rubber hydrochloride which contains insufficient elasticizer to render it, at room temperature, sufficiently stretchable to overcome bagging and wrinkling. For instance, rubber hydrochloride which contains up to but not more than 5 per cent of butyl stearate or an equivalent elasticizer will be referred to herein as rubber hydrochloride film having high internal friction.

In laminating two or more sheets of such film, difficulty was experienced in eliminating bagging and wrinkles. When "let-off" tension was applied in feeding the film to the laminating rolls, in an endeavor to overcome bagging and wrinkles, film containing as much as 5 per cent or more of butyl stearate is readily stretched sufficiently to flatten it out and make entirely satisfactory laminations. But when tension was similarly applied to film of high internal friction at about room temperature, such as unelasticized film or a partially elasticized film which contains 2 or 3 per cent of butyl stearate, it ruptured between the let-off roll and the laminating roll. The commercial film known as Pliofilm N-1 similarly ruptures when subjected to tension in this way. It is a film having high internal friction.

According to this invention, the high internal friction of such films is reduced by heating. This heating may be referred to as a period of thermal elasticization, and the stretching as being done during the period of thermo-elastic after-effect which follows.

The thermal elasticization may be brought about by any one of a variety of different heat treatments. For example, the film may be passed continuously through an oven and then to the lamination equipment. Instead of using an oven, it may be passed over large heated drums. The preferred method of operation is to insert a roll of the film in an oven or other heated chamber and allow it to stay there for some little time until it is to be used. After it has become elasticized so that it may be stretched at about room temperature to eliminate bagging and wrinkles as it is fed to the laminating machine, it is taken out and used. The film may, for example, be stored for five hours at 150° F. prior to lamination. Such heat treatment was found satisfactory for the formation of a single sheet from three plies of cast rubber hydrochloride film containing 2½ per cent of butyl stearate, each ply being .0017 inch thick. The drawing illustrates the lamination of such film.

The three rolls 5, 6, and 7 of this film are fed continuously over guide rollers around the heated drum 8. By suitable springs or the like (not shown), the drum 8 and the rubber roll 9 are pressed firmly together. The drum 8 is driven at an appropriate rate of speed, and the laminated film 10, at it leaves this roll, is drawn through the driven pinch rollers 11. The brakes 12 on the drums or "let-off" rolls 5, 6, and 7 exert enough drag on the film to stretch it longitudinally to a slight degree, not more than a few per cent. This stretching causes the film to lie perfectly flat against the roll 9 and the drum 8.

Of course, the invention is not limited to the treatment of any particular number of plies, but may be applied to any plurality up to 4, 5 or 6 or more. The plies may all be of the same composition and color, or they may differ. For example, they may be different colors, or one ply may contain a relatively high amount of elasticizer, and another ply may contain no elasticizer.

This application is a substitute for my application Serial No. 426,224, filed January 9, 1942.

What I claim is:

1. In the lamination of a plurality of plies of rubber hydrochloride film, the improvement which comprises subjecting a ply of rubber hydrochloride film of high internal friction to thermal elasticization so as to reduce the friction and then, during the period of thermo-elastic after-effect, at a temperature below that required for thermal elasticization stretching it lengthwise to prevent bagging and wrinkling, and while thus stretched uniting it to at least one other ply of rubber hydrochloride by heat and pressure.

2. In the lamination of two plies of rubber hydrochloride film—each containing 2½ per cent of butyl stearate as elasticizer and departing from perfect flatness in a manner characteristic of cast film—the steps of heating the two films so as to thermally elasticize them thereafter at a temperature below that of thermal elastization, but during the period of thermo-elastic after-effect stretching them sufficiently to eliminate bagging and the formation of wrinkles and then uniting them by heat and pressure.

GERALD D. MALLORY.